United States Patent [19]
Hill

[11] 3,830,435
[45] Aug. 20, 1974

[54] PRODUCTION OF CERAMIC-METAL COMPOSITE POWDERS AND ARTICLES THEREOF

[75] Inventor: Brian Hill, Ramsey, N.J.

[73] Assignee: The International Nickel Company, Inc., New York, N.Y.

[22] Filed: June 12, 1972

[21] Appl. No.: 261,799

[52] U.S. Cl. ............................................. 241/27
[51] Int. Cl. ........................................ B02c 19/12
[58] Field of Search .............................. 241/22, 27

[56] References Cited
UNITED STATES PATENTS
| | | | |
|---|---|---|---|
| 3,591,362 | 7/1971 | Benjamin | 241/27 X |
| 3,670,970 | 6/1972 | Szeguari | 241/27 |

Primary Examiner—Granville Y. Custer, Jr.
Attorney, Agent, or Firm—Ewan C. MacQueen; Raymond J. Kenny

[57] ABSTRACT

Ceramic-metal powder products are produced by subjecting a charge of ceramic powder particles and a small volume of metal powder to dry high transmissive energy milling, the weight ratio of impacting media to powder being greater than 1:1 with the milling being conducted for a period beyond the threshold point of the powder constituents, whereby dense, composite ceramic-metal powder particles are obtained having an interdispersion of initial constituent particles, a large internal interfacial surface within individual product powder particles, etc.

13 Claims, 2 Drawing Figures

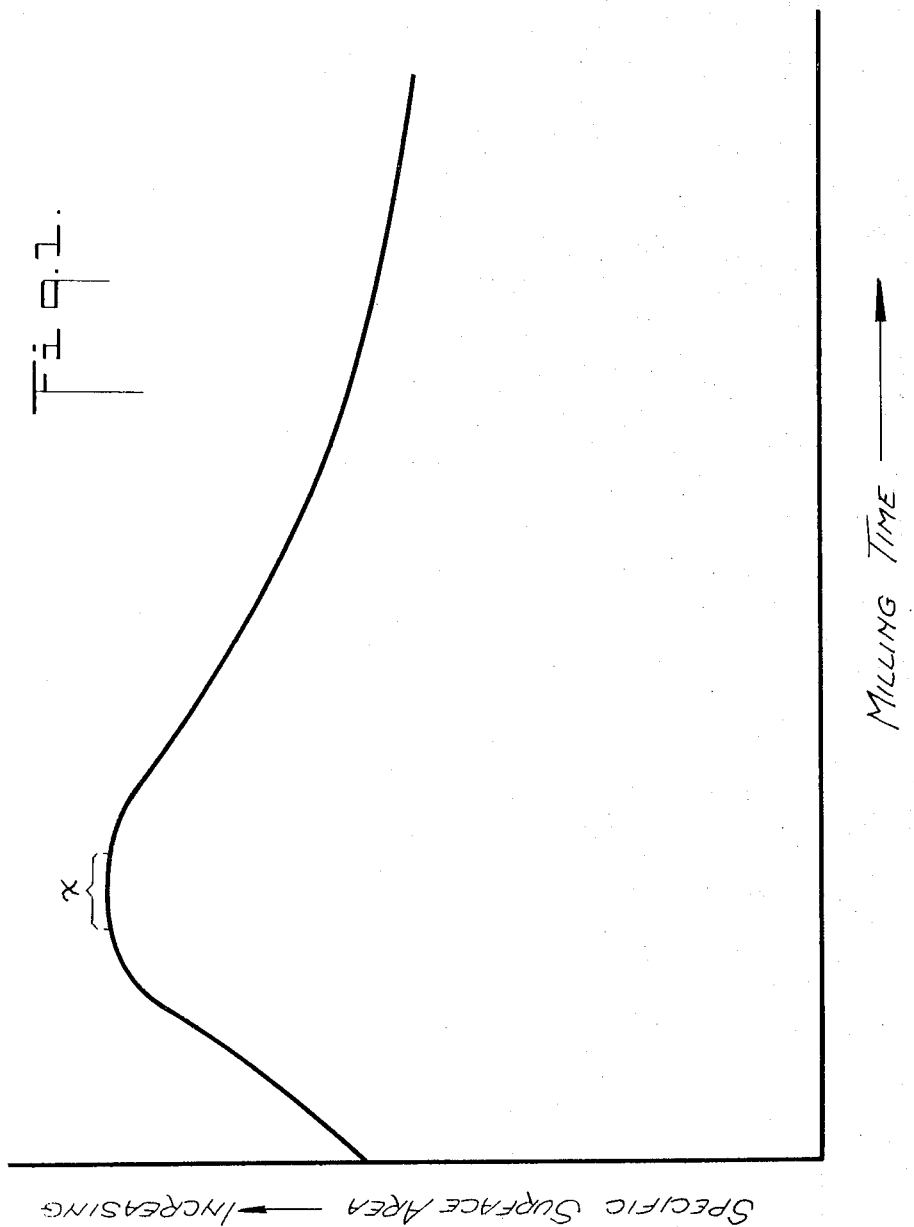

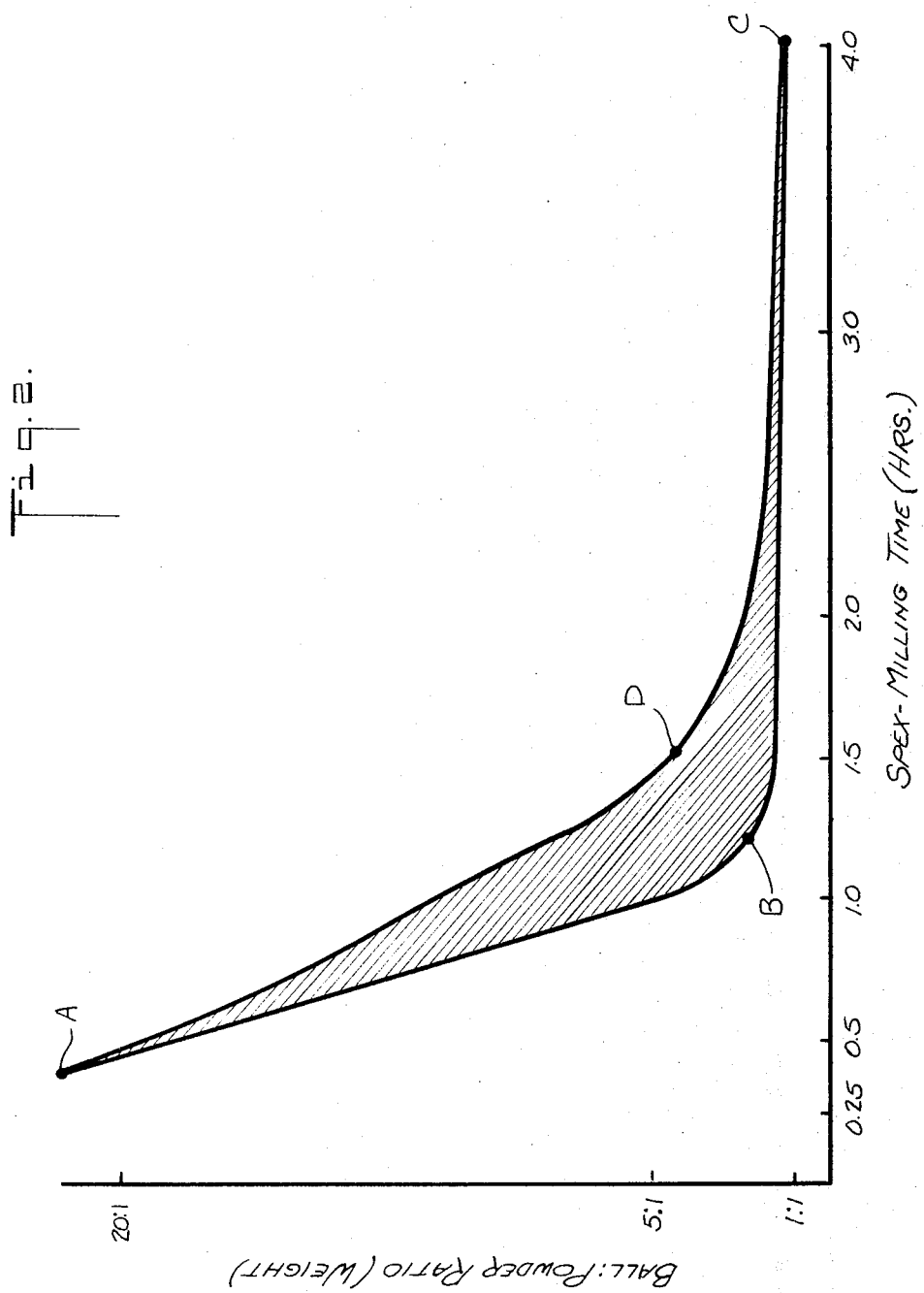

PRODUCTION OF CERAMIC-METAL COMPOSITE POWDERS AND ARTICLES THEREOF

The present invention is addressed to processing metal-containing ceramics, including "cermets," and to products produced therefrom.

As is known, mixtures of ceramics and metals are subjected to various processing operations to provide a number of end products of considerable utility. Cermets, ceramic-metal mixtures which have been hot pressed or sintered, have gained prominence in high temperature applications notably as jet engine components, and have also found use as cutting tools, dies and thermocouple sheaths. And in accordance herewith such products as ferrites, garnets and paint pigments can advantageously be produced from various ceramic-metal combinations.

In terms of processing, it is conventional practice to form a powder mixture of the desired constituents, thereafter grinding the same to prevent or minimize agglomeration, followed by pressing and then firing to sinter the object to desired shape. The pressing (compacting) operation can be conducted either hot or cold; if the former, this may also constitute the sintering operation. In producing ferrites, certain garnets, abrasives, paint pigments, etc., it has been standard procedure to use compounds only, the use of metals being avoided. For such applications, a high reaction temperature is of necessity prior to hot pressing or sintering. This however, contributes to the formation of coarser particles with subsequent attendant disadvantages.

Where reaction temperatures are not of significant important by reason of intended use, e.g., alumina-metal cutting tools, other drawbacks, nonetheless, have been apparent. The high volume of ceramic material present gives rise to an inherent porosity problem which lends to low bulk and green compacting densities and ultimately to excessive shrinkage. This, apart from the fact that ceramics are of high melting point and generally chemically inert, has largely necessitated recourse to high and costly hot pressing or sintering temperatures. Moreover, since ceramics are brittle by nature, it has been difficult at best to achieve a final product characterized by good homogeneity.

It has now been discovered that ceramics containing a small fraction of metal when subjected to dry, high transmissive energy milling as herein described, can be processed at lower temperatures than otherwise might be the case, and/or offer improved bulk and hot compacting densities, less shrinkage upon sintering, finer grained sintered structures, etc.

Generally speaking, the present invention involves dry, high transmissive energy milling of at least one powder ceramic material together with up to 15 percent, e.g., 1 to 10 percent (volume), of at least one metal powder constituent to produce dense, composite powder particles, the particles being characterized by a large internal interfacial surface within individual product powder particles, a surface area less than that of the original constituent powders, exceptional homogeneity with the metal component(s) being most intimately intradispersed throughout the ceramic matrix of each particle, and with individual constituents being distributed substantially uniformly at close interparticle spacings within the product powder particles. Depending upon particle size of the initial materials and milling time, interparticle spacings in the product powder will usually be less than 10 microns, e.g., 5 microns or one micron or even much less, e.g., 0.1 micron.

Furthermore, the composite product particles are characterized by improved bulk density (e.g., when poured into a container and packed by tapping the container), enhanced pressability to provide better green strength and superior hot pressing characteristics in comparison with identical materials prepared by ordinary ball milling, the latter utilizing a liquid medium for particle fragmentation or a surfactant under dry conditions for a similar purpose, grinding being accomplished largely through gravitational action. For example, dry, high transmissive energy milled micron or sub-micron sized alumina-nickel bodies can be hot pressed within 15 minutes to virtually 100 percent density at 1,400°C., whereas conventionally ball milled alumina-nickel seldom reaches 100 percent density though sintered at substantially higher temperatures, e.g., 1,650°C. Moreover, pressed and sintered or hot pressed compacts of the invention are devoid of detrimental porosity, including closed porosity, and are of fine grain and uniform in grain structure, the deviation from mean grain size seldom exceeding about 10 percent. Additionally, less shrinkage occurs during firing, thereby contributing to dimensional accuracy. Other advantages will become apparent herein.

In contrast to conventional ball milling of ceramic-metal combinations, particle size of the initial powder constituents is markedly increased as opposed to being comminuted, surface area being reduced rather than enalrged. Accordingly, energy transmission to the particles milled must be sufficiently intense to cause intimate mechanical cold interdispersion bonding of the starting constituents with large internal interfacial surfaces, a concept which, insofar as I am aware, is unknown in respect of the treatment of ceramic materials normally regarded as being inert, e.g., alumina, and highly fragmentable due to inherent brittleness. Another concomitant of such milling, particularly when the initial charge comprises micron (less than 20 microns) or sub-micron particles, is X-Ray line broadening. This is distinct from dry milling in an ordinary ball mill which usually does not result in any notable X-Ray line broadening on a comparable short time milling basis.

High transmissive energy dry milling may be accomplished in high energy machines such as the Szegvari attritor, the highspeed laboratory shaker mill ("Spex" mill) or even in vibratory ball mills, but the ratio of grinding or impacting media to powder should be greater than about 1:1 (by weight) preferably being at least about 3:1 or 5:1, and most advantageously being at least 10:1. During the course of the process, comminution of both initial constituents and mechanically cold-bonded interdispersed constituents also takes place, with a major site of the bonding and comminution actions apparently being the surface of the grinding media, e.g., balls, which may be steel, tungsten, carbide, nickel, alumina, etc.

It is important that the surface lattice structure of the ceramic powders be broken down, altered or otherwise disrupted by the dry, high transmissive energy impaction. By so doing, a considerable number of surface defects are formed, it being deemed that such defects are necessary to enable cold interdispersion bonding and particle growth to ultimately take place; otherwise, mere agglomeration will ensue (and agglomeration has largely occasioned the use of liquid media and surfactants heretofore). The onset of the mechanical interdispersion bonding phenomenon can be referred to as the "threshold point" and is depicted at region "X" in FIG. 1. It represents the approximate period in time during which the slope of the comminution vs. bonding curve is changing from a comminution zone (powders are primarily being comminuted or fragmented) through a neutral zone (tangent to the curve being zero at which point neither comminution nor bonding significantly exceeds the other) and into a bonding zone (particle growth and reduced surface area predominating). Milling should be continued beyond the "threshold point."

The overall milling period, as will be understood by those skilled in the art, cannot be precisely defined for it will obviously depend on the particular ceramic powder (or powders) and metal (or metals) being milled, the amount of energy transmitted from the bombarding media to the powder, including ball-to-powder ratio, etc. However, for a Spex mill (or equivalent energy machine) it is quite advantageous, if not indispensible, that the weight ratio of impacting media to powder on the one hand to milling time on the other be such as to represent a point above the curve ABC and most beneficially above curve ADC of FIG. 2. While presently available Spex mills are of laboratory size, it will be nonetheless seen that even for such high energy mills that a ball-to-powder weight ratio of 1:1 is considered unsatisfactory irrespective of milling time.

It is important that the milling be conducted dry and the use of solid or liquid separating agents, lubricants, detergents, etc., be avoided in the mill as otherwise the interdispersion bonding and the increase in internal interfacial surface which characterize the intensively dry milled powders is undesirably interfered with or is prevented. The increase in internal interfacial surface can be measured by a combination of decrease in crystallite size measured by X-Ray line broadening, increase of particle size measured by electron microscopy and decrease in specific surface area s measured by B.E.T. apparatus.

As intensive dry milling proceeds the internal homogeneity of the product powder improves up to an optimum milling time which, as will be appreciated by the artisan, is deemed to be mostly a function of the powder system being milled. Continued milling does not appear to further imprve homogeneity of the product powder. Homogeneity can be followed by the electron beam microprobe, the scanning electron microscope, and similar techniques. In some cases, intensive dry milling provides homogeneity in the product on a scale approaching the molecular, a point exceeding the capability of presently available measuring devices.

In conducting dry, high transmissive energy milling in accordance with the invention, it is usually necessary to employ a charge comprising grinding media together with the powdered material to be milled. The entire charge is then subjected to accelerative forces such that a substantial portion of the grinding elements, e.g., ball elements, are continuously and kinetically maintained in a state of relative motion. In striving for best results, it is advantageous to maintain a major portion of the attritive elements out of static self contact, the kinetic accelerative forces causing a substantial number of elements repeatedly to collide with each other. It is difficult to achieve such a state of kinetic activation of a high proportion of attritive elements, e.g., balls, in the ordinary ball mill in which usually a substantial proportion of the ball elements, i.e., those in the lower portion of the ball charge, remain in static bulk contact. Usually, only the balls in the active cascading zone of an ordinary all mill can be said to be kinetically active.

Advantageously, at least about 80 percent of the grinding media present in the charge should be maintained in a highly activated state. It is usually necessary that mechanical energy be applied to the ball elements multidirectionally, such as through the application of vibratory or oscillatory motion to the balls. As an example, the high speed shaker mill (Spex mill) oscillates at rates of up to 1,200 cycles or more per minute, subjecting attritive elements present in the mill to velocities of up to about 300 centimeters per second. In such a mill the ratio of ball elements by weight to the weight of the powder being milled may be relatively low, e.g., about 3:1 or more. At lower levels of applied mechanical force than can be realized in the high speed shaker mill, it is usually necessary that the weight ratio of grinding elements, e.g., balls, to the powder being milled should be higher, e.g., 10:1 or more.

With regard to the particle size range of powdered materials treatable in accordance with the invention, they may vary over the range from about 0.01 to about 150 microns, preferably not exceeding about 0.05 to about 10 microns. Coarse initial powders, e.g., about 40 microns average particle size, tend to prolong the milling time since the particles must be comminuted in the mill before an homogeneous dispersion with large interfacial area can be obtained.

To give those skilled in the art a better appreciation of the invention the following illustrative examples are given.

EXAMPLE I

A. An all oxide charge consisting of 9.54 gms. of NiO, 22.36 gms. of ZnO plus 68.62 gms. of $Fe_2O_3$ was ball milled in an ordinary mill at a ball-to-powder ratio of 20:1 for 16 hours under dry conditions and then for 8 hours under wet (water) conditions. Thereafter, the milled product was heated in air at 900°C. for one hour. It was determined that 94.9 percent reaction occurred to form nickel ferrite.

B. Heating for 1 hour at 800°C. and at 700°C. resulted in reactions of 91.5 percent and 87 percent, respectively.

EXAMPLE II

A. Using the same milling conditions as in Example I, nickel was used instead of NiO, 7.76 gms. of nickel plus 23.0 gms. of ZnO plus 69.6 gms. of $Fe_2O_3$ being reacted in air at a temperature of 900°C. The percentage reaction was approximately 88.4 percent.

B. At a temperature of 800°C., the reaction was 85.6 percent.

It is to be observed that milling in an ordinary ball mill resulted in a lower reaction rate using nickel metal as opposed to the use of nickel oxide in Example I.

EXAMPLE III

A. Using a Spex mill and dry milling conditions, 5 gms. each of NiO, ZnO and $Fe_2O_3$ were separately milled for 45 minutes each using a ball-to-powder ratio of 20:1. The three oxides were blended together (0.477 gms. of NiO, 1.118 gms. of ZnO and 3.41 gms. of $Fe_2O_3$) and heated in air at 900°C. for 1 hour. The resulting reaction was 85.8 percent.

B. However, when the three oxides were co-milled in the Spex apparatus under identical conditions the reaction was 99.1 percent. This results from a more intimate dispersion coupled with the large interfacial surface obtained within individual product powder particles.

C. At temperatures of 800°C., 700°C. and 600°C., the percentage reactions were 98 percent, 95.5 percent and 87 percent, respectively, for the powders Spex milled together.

EXAMPLE IV

A. A charge of 5 gms. each of nickel, ZnO and $Fe_2O_3$ were milled separately in a Spex mill under the same conditions as set forth in Example III-A. When blended and heated in air at 900°C. for one hour the reaction was a low 85.7 percent. When the component powders were Spex milled together (0.383 gms Ni 1.15 gms. ZnO and 3.48 gms. $Fe_2O_3$) a verty high reaction of 99.2 percent was obtained. Thus, the same general pattern was experienced as in Example III-A and III-B.

B. However, when reacted in air at 800°C. and 700°C., the same outstandingly high reaction of approximately 99 percent was obtained. Indeed, at 600°C. the reaction was over 96 percent. A very reactive oxide is thus formed and in situ.

These data illustrate that significantly lower reaction temperatures can be employed when the system initially contains a metal (nickel) as opposed to the compound form (nickel oxide). As a consequence, finer sized composite particles are available to ultimately provide finer-grained sintered or hot pressed products such as ferrites and garnets.

EXAMPLE V

A charge consisting of 1.36 gms. of fine carbonyl nickel powder having an average particle size of about 4 microns and 3.64 gms. of less than one micron $Fe_2O_3$ was milled dry in a Spex mill with 100 gms. of 52,100 steel balls for 45 minutes. The resulting milled powder was heat treated in oxygen at 900°C. for one hour whereupon it was found that the materials had reacted to the extent of 93 percent to form nickel ferrite. This contrasts with only a 63 percent reaction with an ordinary mill at 20:1 ball-to-powder ratio. This Example further indicates that through dry, high transmissive energy milling it becomes possible to produce ferrites with essentially a single heating, for example, the heating after pressing, whereas the use of conventional ball milling usually requires two heatings, namely, a first heating to secure reaction of the milled materials followed by regrinding and then a second heating of the pressed reacted powders.

The volume per cent of nickel in this Example was approximately 16.1 percent. This was the necessary amount to form the nickel ferrite compound. Accordingly, where stoichiometrically necessary to form a compound, the metal value can exceed 15 percent.

EXAMPLE VI

A charge of 4.5 gms of high purity alpha alumina having a particle size of about 0.3 microns and 0.5 gms. of fine carbonyl nickel powder having an average particle size of about 4 microns was milled in the Spex mill under dry conditions for 90 minutes using steel balls at a ball-to-powder ratio of 20:1. A portion of the thus-milled powder was hot pressed at 3,000 pounds per square inch (psi) at 1,500°C. for 15 minutes in a square graphite die to yield a cutting tool blank. The tool blank was of 100 percent density, had a grain size of about 2 microns, a uniform grain diameter which did not depart from the means value by more than 5 percent, and a hardness of 93 Rockwell "A." The blank was ground to three-fourths inch × three-fourths inch × three-sixteenths inch using diamond wheels with the finishing wheel having 320 mesh diamonds of 100 concentration. A one-sixteenth inch nose radius was then ground on each corner and finished using a light hand honing.

Tools prepared as thus described were then compared for tool life against a commercial ceramic tool CCT—707 of the same dimensions. The test material was SAE 4340 steel bars initially 5.9 inches in diameter by 18 inches long, quenched and tempered to a hardness of 50 to 52 Rockwell "C." No cutting fluid was used in the tests. The tool inserts were mounted in a tool holder and approached the test material at −5° back and side rake, 15° Side cutting edge angle, 15° end cutting edge angle and 5° relief. A 0.050 inch depth of cut was used with a 0.005 inch feed per revolution. Tool wear was measured with a traveling microscope having a measuring capability of 0.0001 inch. Tool life end point was taken as 0.015 inch uniform flank wear or 0.030 inch localized wear, whichever occurred first.

Tests were conducter at three cutting speeds in each case to plot a representative tool life curve for each tool. In many tests the length of the cut exceeded the length of the test bar with the results that each succeeding cut was conducted on a reduced bar diameter. In such cases, the cutting speed was averaged over the length of the cut. The data obtained demonstrated that for a tool life of 30 minutes, tools made in accordance with the invention had a cutting speed of 520 surface feet per minute, whereas the commercial tool demonstrated a cutting speed of only 400 surface feet per minute. Under the test conditions employed, the cutting speed determined on the commercial tool very closely reproduced data on the commercial tool obtained at a standard testing laboratory in cutting the same tupe of steel.

EXAMPLE VII

Illustrating the use of the invention for producing paint pigments a mixture containing, by weight, about three parts of nickel, about 12 parts antimony and about 96 parts of rutile was Spex milled using steel balls with a ball-to-powder ratio of about 20:1 for 45 minutes. The product was fired at about 1,000°C. for 1 hour, the characteristic yellow color of the nickel-antimony-titanate pigment being developed. The particle size of the material after firing was less than 40 microns. The characteristic yellow color was developed in a time period about 19 hours shorter than is possible when nickel oxide, antimony oxide and rutile are mixed in the ordinary ball mill for 96 hours prior to firing to give the same composition. In addition, the characteristic yellow color was developing at 850°C. after one hour of heating, which is 100°C. lower than is possible when the oxides are mixed in the ordinary ball mill prior to firing.

In addition to the foregoing, other advantages of the instant invention include a greatly reduced milling period in comparison with conventional ball milling and this is a decided economic advantage, apart from delivering a superior product. This is achievable in periods of but one-half to a few hours versus up to 48 hours or more which prevail using standard processing. Moreover, the occurrence of intragranular porosity is greatly inhibited. This is attributable to the fine grain structure of the hot pressed or pressed and sintered product. If the grains are growing, intragranular porosity is a likely consequence and, as is known, this is virtually impossible to eliminate. It should also be pointed out that the structure of the product powders is block-like rather than plate-like, the aspect ratio of the produced powders being less than about 10:1. This is beneficial in achieving good packing characteristics and uniform mechanical properties in all directions, i.e., the composite product particles are devoid of detrimental anisotropic effects.

The invention is applicable to a wide variety of metal-containing ceramic combinations, including those in which the ceramic is an oxide of such elements as aluminum, titanium, magnesium, beryllium, silicon, calcium, lanthanum, cerium, yttrium, iron, nicel, cobalt, copper, manganese, tantalum, columbium, thorium, zirconium, hafnium, antimony, zinc and chromium; or a carbide of such elements as silicon, boron, zirconium, hafnium, tantalum, vanadium, molybdenum, tungsten, niobium, titanium; or a boride of the high melting metals of the fourth, fifth, sixth periodic groups; or a high melting point nitride of such elements as beryllium, boron, aluminum, silicon, the lanthanides and actinides, scandium, titanium, vanadium, yttrium, zirconium, niobium, hafnium and tantalum; or even a sulfide of such constituents as cerium, thorium, etc. The foregoing can include to advantage from 2.5 to 12.5 percent of metals by volume, including iron, nickel, cobalt, molybdenum, tungsten, copper, zinc, etc. It is considered that the subject invention is particularly applicable in the production of spinels, such as nickel ferrite; hexagonal ferrites, e.g., barium ferrite; titanates, including barium titanate; and garnets, such as yttrium iron garnet.

As will be apparent to the artisan, the invention is to be distinguished from producing "powder agglomerates" which are essentially clusters or masses of loose (sometimes packed) powder, and also from welding in which one constituent is simply joined to another, there being a distinct absence of solid state intimate and homogeneous interdispersion bonding.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for producing dense, ceramic composite product powder particles containing a small volume fraction of at least one metal constituent, the ceramic-metal product particles having a large internal interfacial surface within individual product powder particles, a surface area less than that of the original constituent powders, excellent homogeneity with the metal being intimately intradispersed throughout the ceramic matrix of each product particle and with the individual constituents being distributed substantially uniformly at close interparticle spacings within the product powder particles, which comprises forming a charge of ceramic-metal powder and milling impacting media, the volume of metal not exceeding 15 percent except slightly higher to give the stoichiometric volume required to form an intended compound product powder, and with the weight ratio of impacting media to powder being greater than 1:1, subjecting the charge under dry conditions to high transmissive energy milling such that the individual constituent powder particles are continuously brought into contact with the compressive energies of the impacting media, and continuing such period beyond the threshold point of the powder constituents, whereby dense, homogeneous, mechanically cold-bonded composite, ceramic metal product powder particles are produced.

2. A process in accordance with claim 1 in which the weight ratio of impacting media to ceramic-metal powder is at least 3:1.

3. A process in accordance with claim 2 in which the weight ratio of impacting media to ceramic-metal powder is at least 10:1.

4. A process in accordance with claim 2 in which at least 60 percent of the impacting media is maintained in a highly active state.

5. A process in accordance with claim 2 in which the ceramic metal powder charge contains at least one member from the group consisting of alumina and nickel.

6. A process in accordance with claim 5 in which the composite product powder particles are used to form a cutting tool.

7. A process for producing a cutting tool in which the ceramic metal product powder particles of claim 5 are hot pressed in a die to provide a cutting tool blank and the blank is ground to the desired tool dimensions.

8. A process for producing dense, ceramic composite product powder particles containing a small volume fraction of at least one metal constituent, the ceramic-metal product particles having a large internal interfacial surface within individual product powder particles, a surface area less than that of the original constituent powders, excellent homogeneity with the metal being intimately intradispersed throughout the ceramic matrix of each product particle and with the individual constituents being distributed substantially uniformly at close interparticle spacings within the product powder particles, which comprises forming a charge of ceramic-metal powder and milling impacting media, the ceramic-metal charge being formulated to provide ceramic-metal product powder particles which upon heating react to form a member from the group consisting of spinels, hexagonal ferrites, titanates and garnets, and in which the volume of metal is from about 2.5 to 12.5 percent and with the weight ratio of impacting media to powder being greater than 1:1 subjecting the charge under dry conditions to high transmissive energy milling such that the individual constituent powder particles are continuously brought into contact with the compressive energies of the impactng media, and continuing such period beyond the threshold point of the powder constituents, whereby dense, homogeneous, mechanically cold-bonded composite, ceramic metal product powder particles are produced.

9. A process in accordance with claim in which the product powder particles of claim 8 are heat treated to form nickel ferrite particles.

10. A process in accordance with claim in which the product powder particles of claim 8 are heat treated to form barium ferrite particles.

11. A process in accordance with claim in which the product powder particles of claim 8 are heat treated to form barium titanate particles.

12. A process in accordance with claim in which the product powder particles of claim 8 are heat treated to form yttrium iron garnet particles.

13. A process in accordance with claim 8 in which the ceramic metal powder particles are heated to form a ferrite, titanite or garnet product.

* * * * *